US009509460B2

(12) United States Patent
Kim et al.

(10) Patent No.: US 9,509,460 B2
(45) Date of Patent: Nov. 29, 2016

(54) APPARATUS FOR RECEIVING DOWNLINK SIGNAL IN A WIRELESS COMMUNICATION SYSTEM AND METHOD THEREOF

(71) Applicant: LG ELECTRONICS INC., Seoul (KR)

(72) Inventors: Eunsun Kim, Anyang-si (KR); Hanbyul Seo, Anyang-si (KR); Byounghoon Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 14/380,335

(22) PCT Filed: Apr. 8, 2013

(86) PCT No.: PCT/KR2013/002920
§ 371 (c)(1),
(2) Date: Aug. 21, 2014

(87) PCT Pub. No.: WO2013/151404
PCT Pub. Date: Oct. 10, 2013

(65) Prior Publication Data
US 2015/0016331 A1    Jan. 15, 2015

Related U.S. Application Data

(60) Provisional application No. 61/621,459, filed on Apr. 6, 2012.

(51) Int. Cl.
*H04L 5/00*    (2006.01)
*H04J 11/00*    (2006.01)
(Continued)

(52) U.S. Cl.
CPC ............ *H04L 5/0032* (2013.01); *H04J 11/005* (2013.01); *H04W 4/06* (2013.01); *H04W 72/005* (2013.01)

(58) Field of Classification Search
CPC .................................................... H04L 5/0032
See application file for complete search history.

(56) References Cited

U.S. PATENT DOCUMENTS

| 2010/0118706 A1 | 5/2010 | Parkvall et al. |
| 2010/0246376 A1 | 9/2010 | Nam et al. |

(Continued)

FOREIGN PATENT DOCUMENTS

| KR | 10-2010-0083677 | 7/2010 |
| KR | 10-2012-0004473 | 1/2012 |

OTHER PUBLICATIONS

PCT International Application No. PCT/KR2013/002920, Written Opinion of the International Searching Authority dated Jul. 15, 2013, 1 page.

(Continued)

*Primary Examiner* — John Blanton
(74) *Attorney, Agent, or Firm* — Lee, Hong, Degerman, Kang & Waimey

(57) ABSTRACT

A method of receiving downlink signal at a user equipment in a wireless communication system is disclosed. The present invention includes receiving an information related to a reference signal of a neighbor cell from a serving cell and performing an interference handling in resources in accordance with the information related to the reference signal of the neighbor cell, wherein the information related to the reference signal of the neighbor cell comprises at least one selected from the group consisting of a cell ID (identity) of the neighbor cell, the number of ports for transmitting the reference signal of the neighbor cell, an frequency information for transmitting the reference signal of the neighbor cell and an time information for transmitting the reference signal of the neighbor cell.

11 Claims, 12 Drawing Sheets

(51) Int. Cl.
*H04W 4/06* (2009.01)
*H04W 72/00* (2009.01)

(56) References Cited

U.S. PATENT DOCUMENTS

| | | | | |
|---|---|---|---|---|
| 2010/0309861 | A1* | 12/2010 | Gorokhov | H04B 1/7103 370/329 |
| 2011/0267997 | A1 | 11/2011 | Seo et al. | |
| 2011/0319025 | A1* | 12/2011 | Siomina | H04B 7/024 455/63.1 |
| 2012/0281670 | A1* | 11/2012 | Tiirola | H04W 56/00 370/330 |
| 2014/0064133 | A1* | 3/2014 | Kazmi | H04W 24/10 370/252 |

OTHER PUBLICATIONS

Korean Intellectual Property Office Application Serial No. 10-2014-7031266, Notice of Allowance dated Jan. 27, 2016, 2 pages.

* cited by examiner (a)

(b)

APPARATUS FOR RECEIVING DOWNLINK SIGNAL IN A WIRELESS COMMUNICATION SYSTEM AND METHOD THEREOF

CROSS-REFERENCE TO RELATED APPLICATIONS

This application is the National Stage filing under 35 U.S.C. 371 of International Application No. PCT/KR2013/002920, filed on Apr. 8, 2013, which claims the benefit of U.S. Provisional Application Ser. No. 61/621,459, filed on Apr. 6, 2012, the contents of which are hereby incorporated by reference herein in their entirety.

TECHNICAL FIELD

The present invention relates to a wireless communication system, and more particularly, to an apparatus for receiving downlink signal in a wireless communication system and method thereof.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide technologies related to receives downlink signal with cell specific reference signal interference handling in a serious interference situation.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

To achieve these and other advantages and in accordance with the purpose of the present invention, as embodied and broadly described, a method of receiving downlink signal at a user equipment in a wireless communication system, according to a $1^{st}$ embodiment of the present invention includes the steps of receiving an information related to a reference signal of a neighbor cell from a serving cell and performing an interference handling in resources in accordance with the information related to the reference signal of the neighbor cell, wherein the information related to the reference signal of the neighbor cell includes at least one selected from the group consisting of a cell ID (identity) of the neighbor cell, the number of ports for transmitting the reference signal of the neighbor cell, an frequency information for transmitting the reference signal of the neighbor cell and an time information for transmitting the reference signal of the neighbor cell.

The $1^{st}$ embodiments of the present invention may include the following contents.

Preferably, if the user equipment fails in receiving the information on the time resource, the user equipment may assume that the neighbor cell has set all subframes as MBSFN (multimedia broadcast single frequency network) subframes.

Preferably, the information on the time resource may include MBSFN subframe configuration of the neighbor cell and wherein the user equipment performs the interference handling in a normal subframe obtained from the MBSFN subframe configuration of the neighbor cell.

Preferably, if the user equipment fails in receiving the information on the frequency resource, the user equipment may assume that the neighbor cell has transmitted the reference signal on a whole frequency band.

Preferably, the interference handling may mean one selected from the group consisting of a cancellation, a rate matching and a puncturing of the reference signal of the neighbor cell.

Preferably, the interference handling may include at least one of a radio link monitoring and a radio resource management.

Preferably, the serving cell may include a pico base station and wherein the neighbor cell comprises a macro base station.

Preferably, the reference signal may include a cell-specific reference signal.

A method of transmitting signal at a base station in a wireless communication system, according to a $2^{nd}$ embodiment of the present invention includes the steps of comprising the steps of receiving an MBSFN (multimedia broadcast single frequency network) subframe pattern from a neighbor cell and transmitting an information related to a reference signal of the neighbor cell including time information for transmitting the reference signal of the neighbor cell, wherein the time information is based on the received MBSFN subframe information, wherein the information related to the reference signal of the neighbor cell is used for interference handling of a user equipment.

The $2^{nd}$ embodiments of the present invention may include the following contents.

Preferably, the method further comprising step of transmitting a radio frame offset and an subframe offset between the neighbor cell and the base station.

Preferably, if the time information for transmitting the reference signal of the neighbor cell is MBSFN subframe pattern comprising of N radio frames, the base station transmits a value corresponding to 'radio frame offset mod N'.

Preferably, the time information for transmitting the reference signal of the neighbor cell is MBSFN subframe pattern to which an adjustment is applied using a radio frame timing of the base station.

Preferably, the adjustment comprising applying circular shift by a radio frame offset between the neighbor cell and the base station to the MBSFN subframe pattern.

Advantageous Effects

Accordingly, the present invention may provide the following effects and/or features.

Although reference signal information of a neighbor cell is insufficient, the user equipment receives downlink signal stably in a manner of efficiently removing the interference from the neighbor cell by means of appropriate assumption.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

BEST MODE

Figure 1:
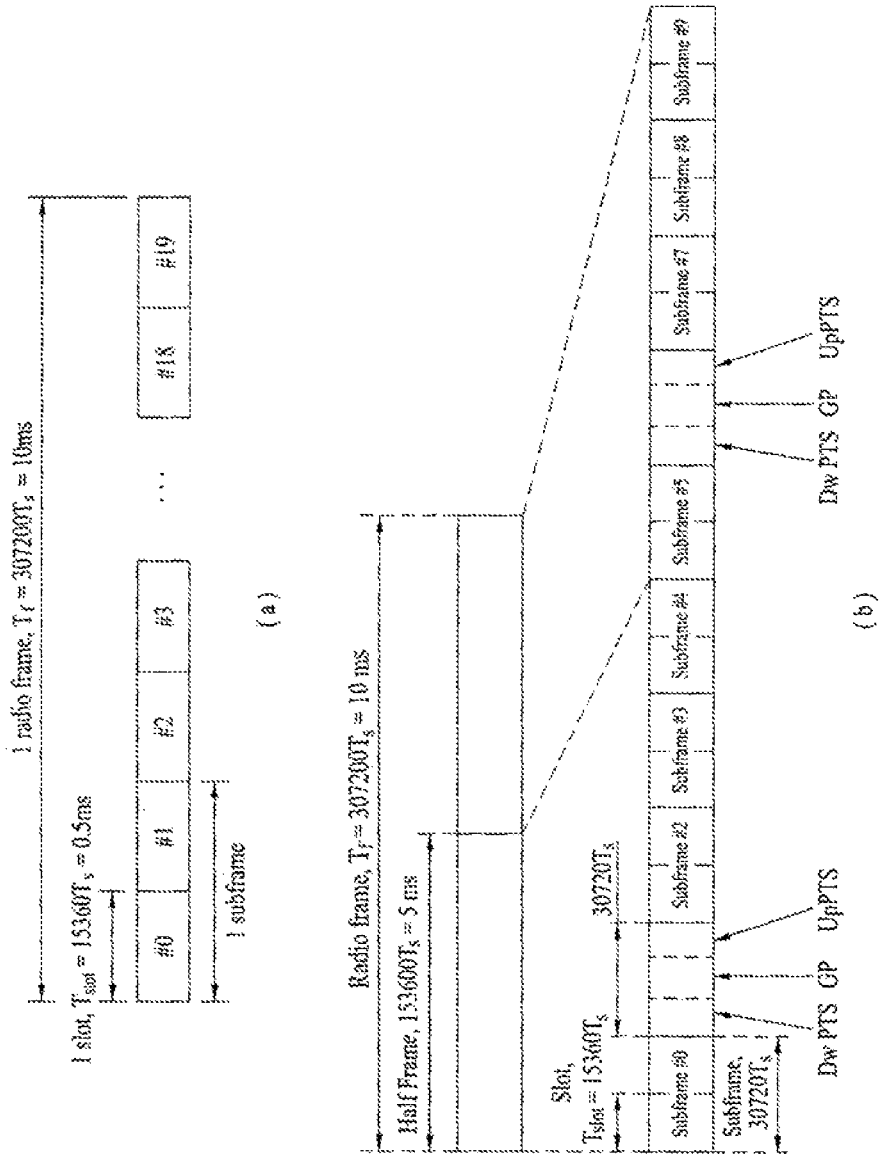
FIG. 1 is a diagram of a structure of a radio frame.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

LTE/LTE-A Resource Structure/Channel

FIG. 1 exemplarily shows a radio frame structure.

The structure of a radio frame in 3GPP LTE system will be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in the time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called an SC-FDMA symbol or a symbol duration. An RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
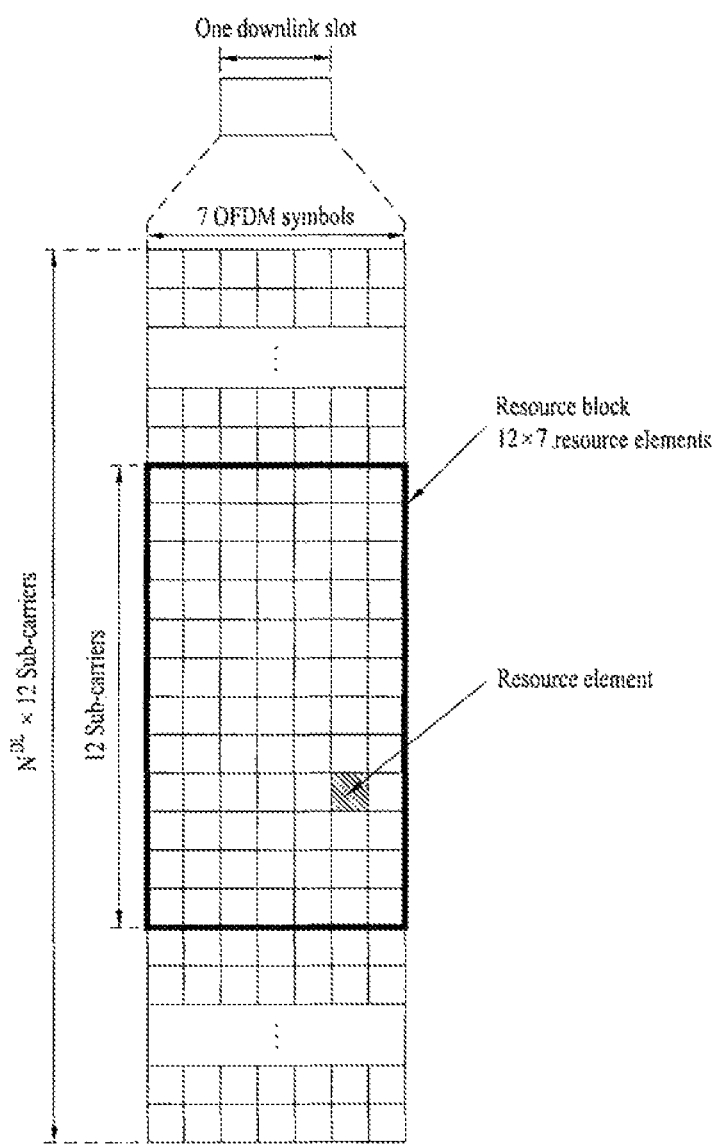
FIG. 2 is a diagram of a resource grid in a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
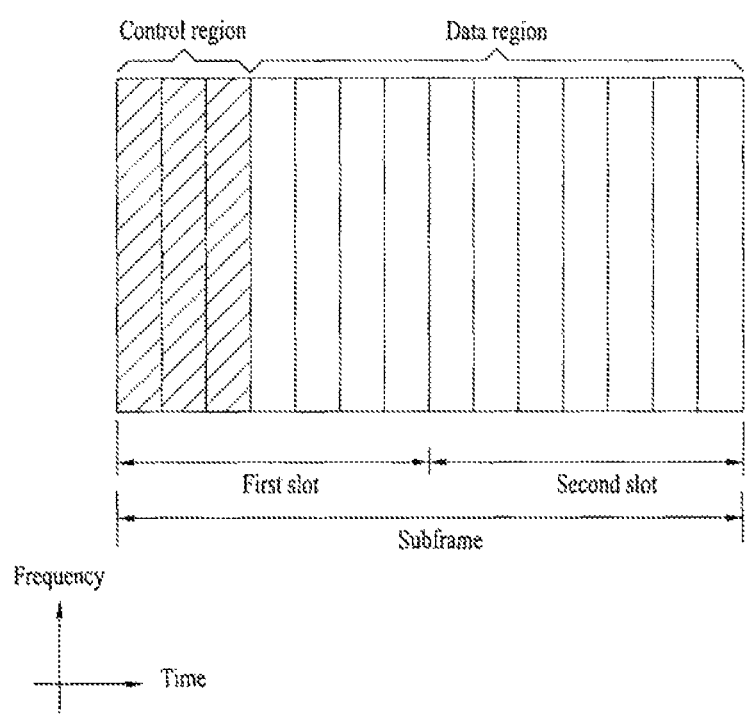
FIG. 3 is a diagram of a structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
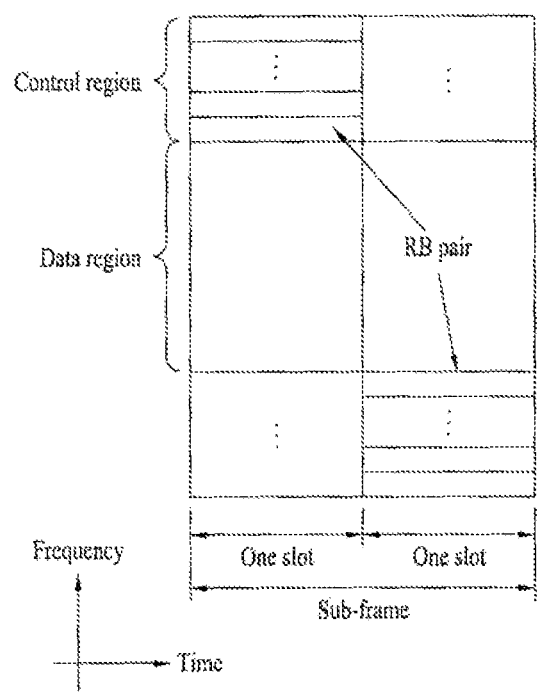
FIG. 4 is a diagram of a structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RS may be divided into downlink RS and uplink RS. In the current LTE system, the uplink RS include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RS are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RS are transmitted;

v) Multimedia Broadcast Single Frequency Network (MBSFN) RS used for coherent demodulation of a signal transmitted in MBSFN mode; and vi) positioning RS used to estimate geographical position information about a UE.

RS may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that a BS (eNB) transmits along with downlink data in specific resources. A UE can demodulate the data by measuring a channel using the RS. This RS should be transmitted in a data transmission area.

CRS serve two purposes, that is, channel information acquisition and data demodulation. A UE-specific RS is used only for data demodulation. CRS are transmitted in every subframe in a broad band and CRS for up to four antenna ports are transmitted according to the number of Tx antennas in an eNB.

For example, if the BS (eNB) has two Tx antennas, CRS for antenna ports 0 and 1 are transmitted. In the case of four Tx antennas, CRS for antenna ports 0 to 2 are respectively transmitted.

Figure 5:
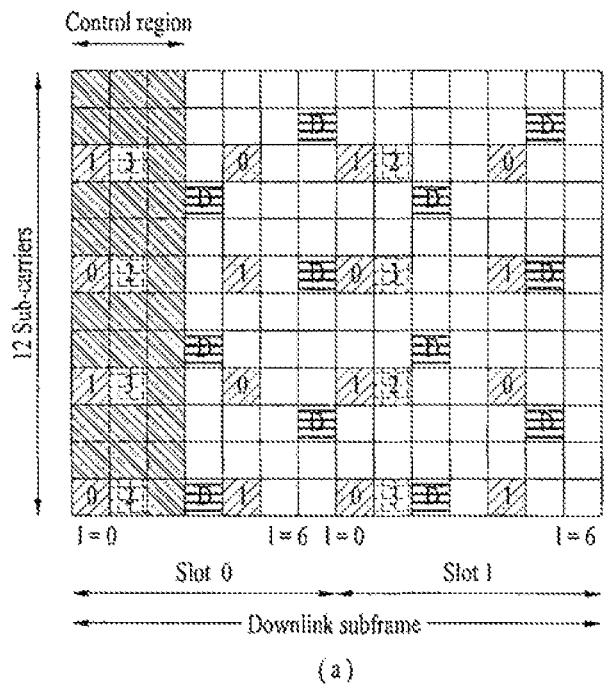
FIG. 5 is a diagram to describe a reference signal.
Figure 5:
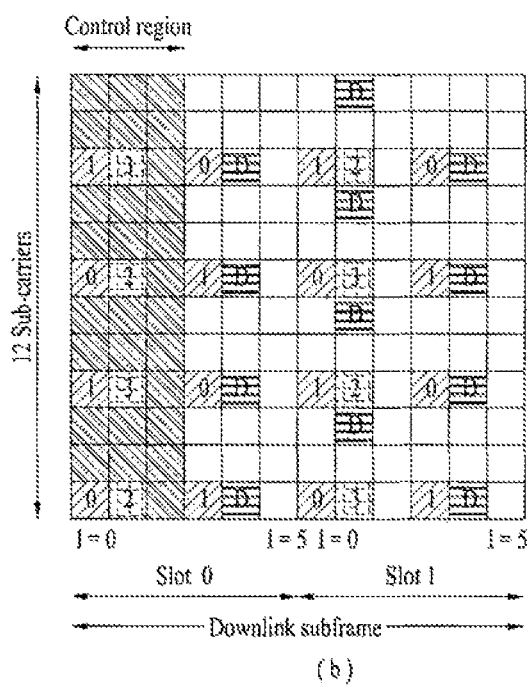

FIG. 5 illustrates patterns in which CRS and DRS are mapped to a downlink RB pair, as defined in a legacy 3GPP LTE system (e.g. Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RS in an RB pair for a system where a BS (eNB) supports four Tx antennas are illustrated. Reference numerals 0, 1, 2 and 3 denote the REs of CRS for first to fourth antenna ports, antenna port 0 to antenna port 3, respectively, and reference character 'D' denotes the positions of DRS.

CSI (Channel Status Information) Feedback

MIMO schemes are classified into an open-loop MIMO scheme and a closed-loop MIMO scheme. The open-loop MIMO scheme means that a transmitter performs MIMO transmission without receiving CSI feedback information from a MIMO receiver. The closed-loop MIMO scheme means that a transmitter receives CSI feedback information from the MIMO receiver and performs MIMO transmission. In accordance with the closed-loop MIMO scheme, each of a transmitter and a receiver can perform beamforming on the basis of CSI so as to obtain a multiplexing gain of a MIMO transmission antenna. The transmitter (for example, BS) can allocate an uplink control channel or an uplink shared channel to a receiver (for example, a user equipment) in such a manner that the receiver can feed back the CSI.

The feedback CSI may include a rank indicator (RI), a precoding matrix index (PMI), and a channel quality indicator (CQI).

RI is information of a channel rank. The channel rank means a maximum number of layers (or streams) via which different information can be transmitted through the same time-frequency resources. Since a rank value is determined depending on long-term fading of a channel, the rank value is generally fed back for a longer period than PMI and CQI. That is, the rank value can be fed back less frequently than PMI and CQI.

PMI is information regarding a precoding matrix used for data transmission from the transmitter, and includes spatial characteristics of a channel. Precoding means that a transmit layer is mapped to a transmit antenna, and the layer-antenna mapping relationship can be determined by precoding matrices. PMI corresponds to a UE-preferred precoding matrix index of a BS on the basis of metric data such as Signal-to-Interference plus Noise Ratio (SINR). In order to reduce feedback overhead of the precoding information, a transmitter and a receiver may share a variety of precoding matrices in advance, and only indices indicating a specific precoding matrix from among the corresponding codebook can be fed back.

Acquisition of an additional multi-user diversity using Multi-User MIMO (MU-MIMO) is under consideration in a system supporting an extended antenna configuration (e.g. an LTE-A system). In MU-MIMO, an interference channel exists between UEs multiplexed in an antenna domain. Therefore, when the eNB transmits a downlink signal based on CSI feedback received from one UE, it needs to perform the downlink transmission in a manner that avoids interference with other UEs. Hence, for a reliable MU-MIMO operation, CSI should be fed back with more accuracy than for a Single-User MIMO (SU-MIMO) operation.

To enable more accurate CSI measurement and reporting, a new CSI feedback scheme may be used by improving conventional CSI including an RI, a PMI, and a CQI. For example, precoding information fed back by a receiver may be indicated by a combination of two PMIs. One of the two PMIs (a first PMI) may be referred to as W1 having a long term and/or wideband property and the other PMI (a second PMI) may be referred to as W1 having a short term and/or subband property. A final PMI may be determined by a function of W1 and W2. For example, let the final PMI be denoted by W. Then it may defined that W=W1*W2 or W=W2*W1.

CQI is information indicating channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

The current LTE/LTE-A system defines 'CSI reference resource' related to channel measurement for the above-described CSI feedback/reporting. The CSI reference resource is defined by a group of physical RBs corresponding to a frequency band for which a CQI is calculated in the frequency domain. From a time perspective, for CSI transmission/reporting in subframe n, the CSI reference resource is defined by a single downlink subframe, $n-n_{CQI\_ref}$ i) For periodic CSI reporting, $n-n_{CQI\_ref}$ is the smallest value greater than or equal to 4, which is a valid downlink subframe. ii) For aperiodic CSI reporting, $n-n_{CQI\_ref}$ is typically the reference resource in the same valid downlink subframe as a corresponding CSI request in a DCI format for uplink transmissions. iii) For aperiodic CSI reporting triggered by a Random Access Response Grant carrying a CSI request, $n-n_{CQI\_ref}$ equals 4. A downlink subframe is considered valid when it is configured as a downlink subframe for a particular UE, it is not an MBSFN subframe except for Mode 9, it contains a DwPTS with a predetermined size or larger, it does not fall within a configured measurement gap for that UE, and for periodic CSI reporting, it should be an element of a CSI subframe set when that UE is configured with CSI subframe sets. A higher layer may configure CSI subframe sets ($C_{CSI,0}$, $C_{CSI,1}$) for the UE. The current standard defines that the CSI reference resource is included in one of the two CSI subframe sets ($C_{CSI,0}$, $C_{CSI,1}$), not in both.

Heterogeneous Deployments

Figure 6:
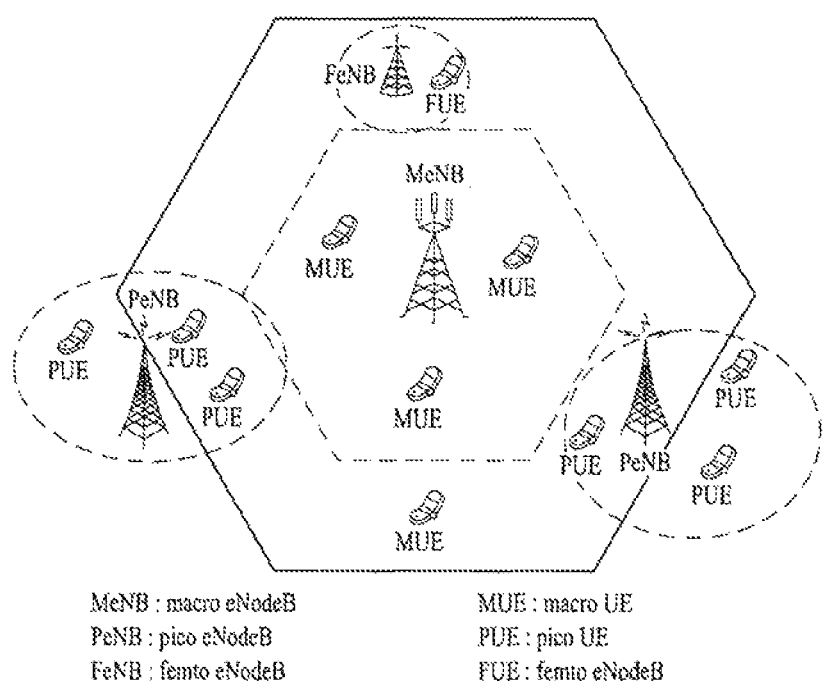
FIG. 6 is a diagram to describe a coordinated transmission cluster.

FIG. 6 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to be handed over to the CSG eNB.

Coordinated Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In this CoMP system, multi-cell BSs (eNBs) can support data for a UE. In addition, the BSs (eNBs) support one or more UEs simultaneously in the same radio frequency resources, thereby increasing system performance. The BSs (eNBs) may also operate in Space Division Multiple Access (SDMA) based on CSI between a UE and the eNBs.

A serving BS (eNB) and one or more cooperative BSs (eNBs) are connected to a scheduler through a backbone network in the CoMP system. The scheduler may receive channel information about the channel states between a UE and the cooperative eNBs, measured by each cooperative BS (eNB) and operate based on the channel information. For example, the scheduler may schedule information for cooperative MIMO for the serving BS (eNB) and the one or more cooperative BSs (eNBs). That is, the scheduler may transmit a command directly to each eNB in regard to the cooperative MIMO operation.

As can be seen from the above description, it can be recognized that a CoMP system operates as a virtual MIMO system by grouping a plurality of cells into one group. Basically, the CoMP system adopts a MIMO communication scheme using multiple antennas.

Figure 7:
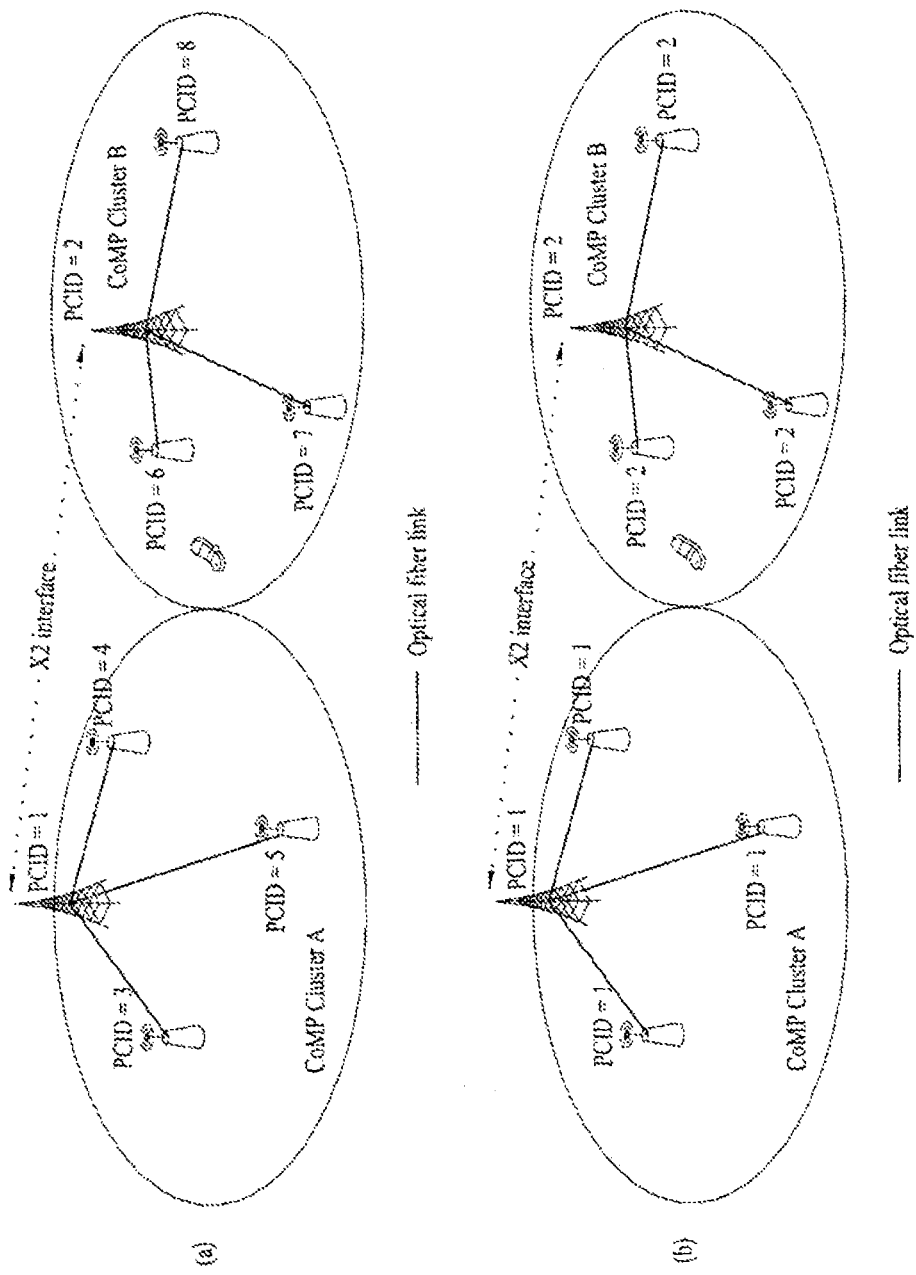
FIG. 7 is a diagram to describe CoMP (coordinated multipoint) cluster.

A CoMP cluster is a set of cells that are capable of performing the CoMP operations (i.e., cooperative scheduling and cooperative data transmission/reception). For example, cells of a single cluster may be assigned different physical cell IDs (PCIDs) as shown in FIG. 7(a), and cells of a single cluster may share the same PCIDs such that the cells may be configured in the form of a distributed antenna or RRH of a single BS. In modified examples of FIG. 7, some cells from among cells of the single cluster may share the same PCIDs.

Generally, cells of the same CoMP cluster are interconnected through a backhaul link, such as an optical fiber having high capacity and low latency, so as to implement cooperative scheduling and cooperative data transmission/reception, such that the cooperative scheduling is possible and maintained at a correct time synchronization state, resulting in implementation of cooperative data transmission. In addition, when receiving signals from cells of the CoMP cluster participating in the cooperative transmission, the size of CoMP cluster must be determined in a manner that a reception time difference between signals transmitted from respective cells can enter the scope of a cyclic prefix (CP) length on the basis of a propagation delay difference between respective cells. In contrast, cells belonging to different clusters may be interconnected through a lower-capacity backhaul link, and may not maintain time synchronization.

A UE configured to perform CoMP can perform cooperative scheduling and cooperative data transmission/reception by some or all of cells contained in the CoMP cluster, and the UE measures a reference signal that is transmitted from some or all cells of the CoMP cluster according to a UE reception signal quality (i.e., QoS of a UE reception signal). In order to measure link performances of UE and each cell, the UE may measure a reference signal of each cell and may report a QoS of the measured reference signal. Specifically, cells to be measured by the UE may be defined as a CoMP measurement set.

For CoMP, there is a need to define the reference resource set through which UE channel measurement and UE channel measurement reporting must be performed, because the CoMP scheme and downlink scheduling, etc. of the corresponding UE are determined according to per-cell channel information to be reported by the UE on uplink. Information (i.e., the CoMP measurement set) indicating that the UE must measure/report signals from a certain cell should be transferred through higher layer signaling, and associated information can be signaled as CSI-RS resources.

Inter-Cell Interference Coordination (ICIC)

In the above-mentioned heterogeneous network environment (heterogeneous deployment) or CoMP environment, inter-cell interference (ICI) may occur. In order to solve the inter-cell interference (ICI) problem, an inter-cell interference coordination (ICIC) may be used.

As an exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP LTE Release-8 system. A variety of parameters may be contained in an ICIC message for frequency resources. For example, a Relative Narrowband Transmission Power (RNTP) related to downlink transmission power, uplink (UL) Interference Overhead Indication (MI) related to uplink interference, UL High Interference Indication (HID), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even under high interference are scheduled in another frequency sub-region in which an HII is set to a first value (for example, 1), one cell having received the ICIC message can avoid interference from another cell having transmitted the ICIC message.

Meanwhile, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of the silencing operation, a specific cell may configure a specific subframe as a Multicast-Broadcast Single Frequency Network (MBSFN) subframe. In a downlink subframe configured as the MBSFN subframe, a signal is transmitted only in a control region and is not transmitted in a data region. As another example of the silencing operation, a cell causing interference may configure a specific frame as a specific Almost Blank Subframe (ABS) or an ABS-with-MBSFN. The ABS refers to a subframe in which only a CRS is transmitted in a control region and a data region of a downlink subframe and the remaining control information and data other than the CRS are not transmitted in the control and data regions of the downlink subframe. If necessary, signals are transmitted at no power or low power in the subframe corresponding to the ABS. Nonetheless, downlink channels and downlink signals such as a Physical Broadcast Channel (PBCH), a Primary Synchronization Signal (PSS), and a Secondary Synchronization Signal (SSS) may be transmitted even in the ABS. The ABS-with-MBSFN may mean a subframe in which even the CRS is not transmitted in the data region of the above-described ABS. As described above, silencing may be performed in units of a specific subframe, and information indicating whether silencing is performed is referred to as a silent subframe pattern.

In association with ABS, ABS signaling defined in 3GPP LTE-A is largely classified into ABS information and an ABS status. The ABS information indicates a subframe to be used as ABS using bitmap. The ABS information is composed of 40 bits in case of FDD, and is composed of a maximum of 70 bits in case of TDD. The number of bits used for ABS information in TDD may be changed according to UL-DL configuration. In case of FDD, 40 bits indicate 40 subframes. If the value of a bit is set to 1, the bit indicates ABS. If the value of a bit is set to zero, the bit indicates non-ABS. When restricted measurement is configured in a UE, the number of CRS antenna ports of the corresponding cell is notified for CRS measurement. A measurement subset is a subset of ABS pattern information. The measurement subset is a bitmap composed of 40 bits in case of FDD, and is a bitmap composed of a maximum of 70 bits in case of TDD. The above information can be understood as a restricted measurement for configuring restricted measurement. Table 1 indicates ABS information defined in the legacy LTE/LTE-A system.

TABLE 1

| IE/Group Name | Presence | Range | IE type and reference | Semantics description |
|---|---|---|---|---|
| CHOICE ABS Information | M | — | — | — |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |

TABLE 1-continued

| IE/Group Name | Presence | Range | IE type and reference | Semantics description |
|---|---|---|---|---|
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . . ) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 2 shows ABS status information elements (IEs) defined in the legacy LTE/LTE-A system. The ABS status information elements are used to enable the eNB to determine whether the ABS pattern must be changed. In Table 2, 'Usable ABS Pattern Info' is bitmap information of a subset of ABS pattern information, and indicates whether a subframe designated as ABS has been correctly used for interference reduction. 'DL ABS status' indicates the ratio of the number of DL RBs scheduled in a subframe indicated by 'Usable ABS Pattern Info' to the number of RBs allocated for a UE to be protected through ABS. 'DL ABS status' may also indicate whether ABS has been efficiently used in a victim cell according to its own purpose.

TABLE 2

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the $eNB_2$ for UEs needing protection by ABS from inter-cell interference for DL scheduling, or allocated by the $eNB_2$ for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |

TABLE 2-continued

| IE/Group Name | Presence | Range | IE type and reference | Semantics description |
|---|---|---|---|---|
| >TDD | | | — | — |
| >>Usable ABS Pattern Info | M | | BIT STRING (1 ... 70) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |

A measurement subset composed of a subset of an ABS pattern is a subframe statically used as ABS, and the remaining subframes contained in the ABS pattern may determine whether a transmission point will be used as the ABS according to traffic load.

Measurement/Measurement Report

A measurement report is used for many techniques designed to ensure the mobility of UEs (handover, random access, cell search, etc.) or for one of the techniques. Since the measurement report needs a certain degree of coherent demodulation, a UE may perform measurement after acquiring synchronization and physical layer parameters, except for measurement of a received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has been failed.

In association with Radio Resource Management (RRM), RSRP is defined as the linear average over the power contributions of REs that carry downlink CRS. RSSI is defined as the linear average of the total received power of a UE. The RSSI is measured from OFDM symbols carrying RS for antenna port 0, including interference and noise power from neighbor cells. If a specific subframe is indicated for RSRQ measurement by higher-layer signaling, the RSSI is measured over all OFDM symbols of the indicated subframe. RSRQ is defined as (NxRSRP/RSSI), where N is the number of RBs over the measurement bandwidth of RSSI.

The purpose of RLM execution is to enable a UE to monitor a downlink quality of its own serving cell, such that the UE can determine 'in-sync' or 'out-of-sync' of the corresponding cell. In this case, RLM is based on CRS. A downlink quality estimated by the UE is compared with each of 'in-sync threshold(Qin)' and 'out-of-sync threshold (Qout)'. Each threshold value may be denoted by a PDCCH BLER (Block Error Rate) of a serving cell. Specifically, Qout may correspond to a BLER of 10%, and Qin may correspond to a BLER of 2%. Actually, Qin and Qout correspond to SINR of the received CRS. If CRS reception SINR is equal to or higher than a predetermined level (Qin), the UE decides to attach the corresponding cell. If CRS reception SINR is less than a predetermined level (Qout), the UE declares a radio link failure (RLF).

As can be seen from the above-mentioned RSRP definition, it should be premised that measurement reporting is performed using CRS. However, assuming that cells share the same PCID as shown in FIG. 7(b), the cells are unable to discriminate between the cels having the same PCID on the basis of the CRS, such that it is impossible to perform RRM of each cell using only measurement reporting including RSRP/RSRQ based on CRS. Therefore, assuming that cells have the same PCID, it is possible to perform additional RSRP/RSRQ measurement reporting on the basis of CSI-RS being independently transmitted. In order to increase reception accuracy during CSI-RS reception of a specific cell, neighbor cells do not transmit signals to a resource element (RE) to which the corresponding CSI-RS is transmitted, such that the neighbor cells can perform higher-accuracy measurement although a frequency of CRS-RS transmission is less than a frequency of CRS transmission. Therefore, although cells have different PCIDs, CRS-based RSRP/RSRQ measurement reporting and CSI-RS RSRP/RSRQ measurement reporting are simultaneously performed, resulting in increased accuracy of a network RRM.

Another purpose of CSR-RS transmission in each cell is to perform CSI feedback to be performed by a UE to aid scheduling of a BS (eNB) that determines a rank, precoding matrix, a modulation and coding scheme (MCS) or CQI to be used for DL data transmission between the corresponding cell and the UE. In accordance with the CoMP transmission scheme, the UE must feed back a CSI to a downlink related to a cooperative cell other than the serving cell. An excessive amount of overhead occurs when CSIs of all cells contained in the CoMP cluster including the serving cell are fed back, such that CSIs of some cells (i.e., CoMP measurement set) contained in the CoMP cluster that is valuable in cooperative scheduling and cooperative data transmission. Deciding of the CoMP measurement set of a specific UE may be configured by selecting cells each having an RSRP of a predetermined level or higher. To achieve the above-mentioned operation, the UE performs RSRP measurement reporting of cells contained in the CoMP cluster including the UE. Alternatively, the BS sets configurations of CSI_RS each of which will perform RSPR or RSRQ measurement to a CoMP measurement set, and informs the UE of the resultant configurations. The UE may perform RSRP or RSRQ measurement of CSI-RS transmitted from cells contained in the CoMP management set. If the measurement result satisfies a specific condition, the UE may perform reporting.

In order to implement ICIC between CoMP clusters, a UE performs RSRP measurement and reporting of cells contained in a contiguous CoMP cluster, such that a network and a UE can recognize which one of cells of the contiguous CoMP cluster gives strong interference to the corresponding UE and can also recognize which one of cells receives strong UL interference from the corresponding UE.

In addition to CRS based RSRP/RSRQ measurement reporting for mobility management of UE handover, the CoMP measurement set configuration and the CSI-RS based RSRP/RSRQ measurement reporting for ICIC are simultaneously performed, such that accuracy and flexibility of network RRM can be increased.

Restricted Measurement

If a cell reduces a transmission (Tx) power of a specific resource region, a variation width of a per-resource-region interference signal received by a contiguous cell is increased. If averaging of the interference signals is achieved irrespective of a resource region, it is difficult to correctly obtain CoMP and ICIC effects. A detailed description thereof will hereinafter be described with reference to FIG. 8.

Figure 8:
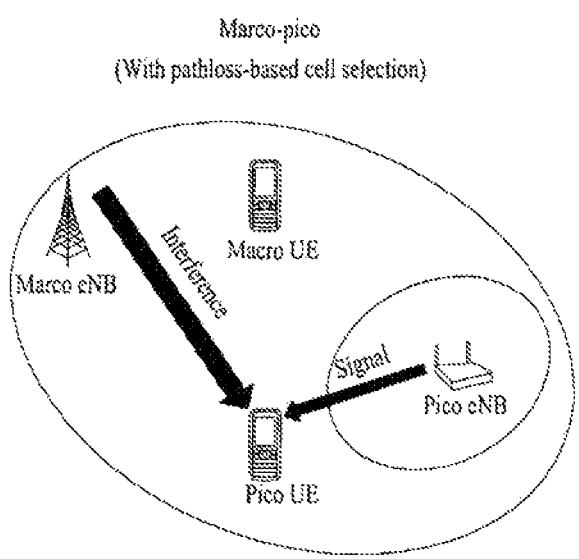
FIG. 8 is a diagram to describe a limited measurement.

Referring to FIG. 8, in case of a normal situation, a macro cell (macro eNB) is used as an aggressor cell of a pico cell (pico eNB). The macro cell (macro eNB) can guarantee/protect performance of the pico cell (pico eNB) using the aforementioned ABS for the pico cell or pico UE. In more detail, the macro cell can deboost a maximum of 9bB transmission power in specific subframe(s), or may not transmit signals in the specific subframe(s), resulting in the cell range extension (CRE) effect of the pico cell. In other words, if a macro cell reduces a downlink transmission power in the ABS, a UE located in the vicinity of a cell edge of cells can recognize that performance of a picocell signal having been received with a noise level or lower in a normal subframe is increased in a manner that data can be stably received in the ABS, such that cell coverage of a pico cell can be actually extended.

Under this situation, restricted measurement may be used for measurement reporting. In other words, if the macro cell reduces a transmission power in a specific subframe through the ABS, signals and/or interference level of the pico cell seen by the UE is greatly changed per subframe, and it is prevented that signals are simply averaged due to introduction of the restricted measurement.

For such restricted measurement, if several CSI subframe sets (e.g., C0, C1) for channel measurement are used as a higher layer signal, the UE can perform channel measurement and reporting dedicated for the CSI subframe set. In addition, it is desirable that the UE may perform ABS measurement of the macro cell for RLM/RRM.

Cell Range Extension (CRE)

Several small-sized pico eNBs (BSs) are installed in a coverage of the macro BS, such that UEs covered by the macro BS are handed over to the pico BS, resulting in traffic dispersion of the macro BS. Handover from a serving BS to a target BS is achieved when target-BS measurement result obtained from the UE is identical to or higher than a predetermined threshold value (Sth_conv). In this case, the network improves UE capability using arbitrary means, such that handover can be performed even though signal strength (e.g., SNR) of the target BS is less than a predetermined threshold. The above-mentioned operation may be referred to as a cell range expansion (CRE). A CRE enable region is referred to as a CRE region/area, and the CRE region may be represented by a specific region in which a reception performance ($S_{received}$) of a reference signal of the corresponding BS is higher than a new threshold value ($S_{th\_CRE}$) for CRE. That is, the CRE region configures the following equation 1.

$$S_{th\_conv} \geq S_{received} \geq S_{th\_CRE} \qquad \text{[Equation 1]}$$

For better understanding of the present invention, a CRE region configured to satisfy Equation 1 may correspond to a shaded part.

Figure 9:
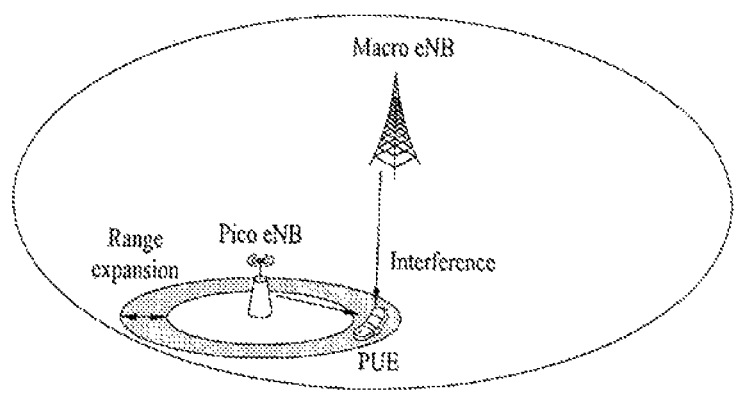
FIG. 9 is a diagram to describe CRE (cell range expansion)

In FIG. 9, a macro eNB enables a PUE located in the CRE region to be handed over to a pico eNB (PeNB), resulting in implementation of traffic offloading. As a result, overall system performance is improved. The CRE can extend a cell range or a cell radius of the corresponding eNB. In the legacy LTE/LTE-A system, a reference signal reception intensity of the PeNB may be denoted by RSRP/RSRQ, a reference for enabling the UE to attach a specific cell satisfies a specific condition in which a difference between the best RSRP and a specific cell RSRP is 6 dB or less on the basis of per-cell RSRP. However, in order to increase the traffic dispersion effect to the PeNB, the reference may be adjusted to 6 dB (e.g., 9 dB) or higher. In this case, the operation (i.e., CRE) for enabling the UE to measure the PeNB, when the UE performs handover to the PeNB and then measures the PeNB acting as a serving cell, influence of interference caused by the macro eNB (that is located close to the PeNB and includes other BSs not shown in drawings may be further increased unavoidably. Therefore, the following description discloses a variety of methods for solving various interference problems encountered when a reference is higher than the CRE reference.

Therefore, the following description discloses a variety of methods for solving various interference problems encountered when a reference is higher than the CRE reference.

In the following description, the UE may have Further enhanced ICIC (FeICIC) capability capable of supporting FeICIC. In this case, FeICIC means that a pico eNB performs CRE of at least 6 dB and at the same time the macro eNb and the pico eNB perform time/frequency ICIC. There are a variety of UE capabilities related to FeICIC capability, for example, CRS interference cancellation (CRS IC) capability (including the number of CRSs to cancel, the number of CRSs capable of being cancelled in one subframe, and information indicating how many cells can be CRS-cancelled) capable of performing cancellation of CRS interference, PSS/SSS IC capability (including the number of PSSs/SSSs to cancel, the number of PSSs/SSSs capable of being cancelled in one subframe, and information indicating how many cells can be PSS/SSS-cancelled) capable of cancelling PSS/SSS interference of a contiguous cell, PBCH IC capability (including the number of PBCHs to cancel, the number of PBCHs capable of being cancelled in one subframe, and information indicating how many cells can be PBCH-cancelled) capable of cancelling PBCH interference of a contiguous cell. Hereinafter, the UE capability related to FeICIC capability will be referred to as CRE-related capability. UE capability information related to CRE may be transferred from a UE to a core network after RRC connection. In more detail, after the UE performs RRC connection, the core network transmits UEcapabilityEnquiry information to the UE through NAS (Non-Access Stratum) signaling, and the UE transmits UE capability information in response to the received UECapabilityEnquiry information. If necessary, the core network may transmit the UECapabilityEnquiry information.

In the following description, the term 'measurement' refers to measurement of at least one of RRM/RLM/CSI unless specially noted, and each of the neighbor cell receiving interference and the serving cell receiving interference may be referred to as a weak cell or a victim cell, and a cell causing interference may be referred to as an aggressor cell.

Figure 10:
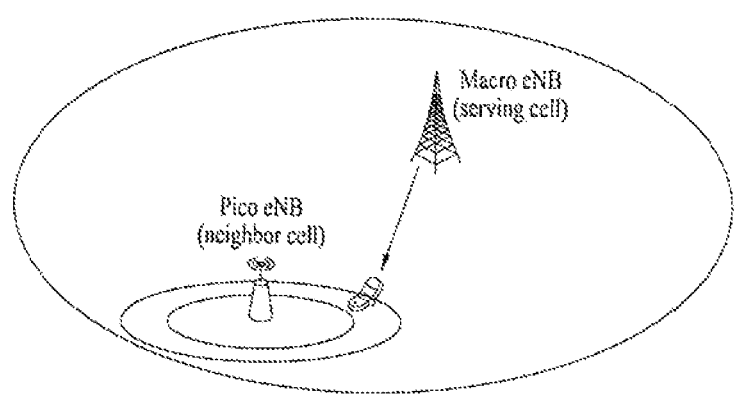
FIG. 10 is a diagram to describe a measurement on a neighbor cell according to one embodiment of the present invention.

FIG. 10 is a conceptual diagram illustrating a method for enabling a macro UE located in a CRE region having a bias value of a high level (e.g., 6 dB or higher) to measure a neighbor cell (e.g., a pico eNB).

In FIG. 10, when a UE attempts to measure a pico eNB corresponding to a neighbor cell, it may be impossible for the UE to measure the pico eNB due to the occurrence of interference generated from a macro eNB. In addition, the operation for enabling a UE to measure a pico cell assumes that the UE has already acquired synchronization from the pico cell, and the UE may have difficulty in acquiring synchronization due to interference of a signal transmitted from the macro eNB. In addition, the problem encountered in synchronization acquisition may also be substantially identical to the problem encountered in handover synchronization acquisition.

If the UE has a receiver for interference cancellation, the eNB may inform the UE of the PSS-to-CRS power ratio of its own cell and neighbor cell, the SSS-to-CRS power ratio, and the PBCH-to-CRS power ratio, the UE may remove interference such as PSS/SSS/PBCH of the cell causing such interference, such that handover to a weak cell can be smoothly carried out. In this case, if estimation of channels (such as PSS/SSS and PBCH) is achieved on the basis of CRS, the PSS/SSS to CRS power ratio and the PBCH to CRS power ratio must be signaled to the UE. Specifically, if a dominant interference source of the target cell for handover is a cell currently attached to the UE, the eNB can transmit the PSS/SSS/PBCH to CRS power ratio of its own cell.

In accordance with another embodiment, instead of using signaling of the PSS/SSS/PBCH-to-CRS power ratio of its own cell and a neighbor cell, the UE may assume the PSS/SSS-to-PBCH transmission power ratios of its own cell and a neighbor cell in a manner that the UE can recognize the degree of interference of the neighbor cell. For example, the UE must assume that corresponding channels are transmitted with either the same transmission power or a difference of a predetermined level (delta_power) compared with CRS, and such information may be promised as a higher layer signal. Preferably, in order to perform not only performance improvement of a channel reception signal from the UE serving cell but also interference cancellation of the reception signal, the BS may perform signaling of per-channel CRS power ratios of its own cell and a neighbor cell as necessary.

As an example for reliably receiving/demodulating PSS/SSS/PBCH in a serious interference environment, the UE may detect a cell only in a subframe established as ABS by macro eNBs. That is, when ABS patterns are exchanged between the macro eNB and the pico eNB, subframe offset information between individual eNBs is also exchanged, such that a subframe for PSS/SSS/PBCH transmission of the macro eNB may not collide with a subframe for PSS/SSS/PBCH of the pico eNB. In addition, the macro eNBs exchange ABS patterns with one another in consideration of the above information, and each macro eNB may certainly set the subframe requisite for the pico eNB configured to transmit PSS/SSS/PBCH to the ABS as necessary. The UE may attempt to detect PSS/SSS/PBCH only in a subframe established as ABS by the macro eNBs.

However, under this condition, it is impossible for the UE to recognize correct information (for example, pattern information) regarding an ABS-configured subframe decided by the macro eNB, and the UE can analogize the ABS through the received subframe set.

Therefore, the eNB can transmit subframe information ((MeasObjectEUTRA IE) including subframe patterns required for neighbor-cell measurement to the UE through RRC signaling. The subframe patterns are shown in the following Table 3.

TABLE 3

```
MeasSubframePatternConfigNeigh-r10 ::= CHOICE {
    release                                               NULL,
    setup                                                 SEQUENCE {
        measSubframePatternNeigh-r10    MeasSubframePattern-r10,
        measSubframeCellList-r10            MeasSubframeCellList-r10
        OPTIONAL          -- Cond measSubframe
    }
}
``` measSubframeCellList

List of cells for which measSubframePatternNeigh is applied.
measSubframePatternNeigh Time domain measurement resource restriction pattern applicable to neighbour cell RSRP and RSRQ measurements on the carrier frequency indicated by carrierFreq. If MBSFN configuration of neighbour cells is unknown or not uniquely defined then for cells in measSubframeCellList the UE shall assume that the subframes indicated by measSubframePatternNeigh are non-MBSFN subframes.

As can be seen from Table 3, the subframe information may include a sub-element denoted by "MeasSubframePatternConfigNeigh-r10", and this means that the eNB commands the UE to perform restricted measurement in a time domain. "measSubframePatternNeig(-r10)" of the sub-element indicates a subframe pattern required for measurement of the neighbor cell, and "measSubframeCellList(-r10)" indicates the list of cells to which "measSubframePattern-Neig(-r10)" is applied. That is, through the above-mentioned sub-element, the eNB can allocate the subframe pattern required when a UE performs RSRP/RSRQ measurement of the cell list to the UE.

The subframe pattern, i.e., measSubframePatternNeig, may be designated as a subframe pattern allocated to ABS. Specifically, in order to enable the UE to acquire synchronization from the pico cell under the condition that the macro eNB has a serious interference environment of a high CRE bias, the eNB may include a subframe transmitted from PSS/SSS/PBCH in the subframe pattern. In addition, the UE may assume that a synchronization signal from a pico eNB acting as a pico cell is transmitted from a subframe corresponding to the subframe pattern.

The eNB may enable the UE to be handed over to a specific pico eNB on the basis of the UE measurement report result. For handover to the pico eNB, the macro eNB can further transmit a variety of information (for example, system information of the corresponding pico eNB, MIB (Master Information Block) information for use in the LTE system, an SFN of the corresponding cell, a difference in SFN between the serving macro eNB and the pico eNB, etc.) to the UE. Here, since there may be a difference between the above SFN and another SFN actually acquired by a UE through a PBCH of the pico eNB, the subframe offset/radio frame offset of the SFN can transmit the OFDM symbol offset/sample offset between two cells so as to indicate a correct timing offset between two cells. Since it may also be impossible to decode a PBCH of the pico eNB due to interference caused by the PBCH of the macro eNB, the macro eNB can pre-transmit system information of a target cell, and MIB and SFN/SFN offset information transmitted over a PBCH to the UE during the handover or prior to the handover, such that the corresponding UE can be handed over to the pico eNB without decoding the PBCH of the pico eNB.

In addition, it can be explicitly recognized that two cells maintain synchronization of a predetermined degree. In this case, the UE can perform synchronization acquition/tracking through another cell in which the UE can maintain synchronization with the pico eNB or the corresponding pico eNB.

If the UE has interference cancellation capability, the macro eNB may transmit the PBCH to CRS power ratio of aggressor cells of the pico eNB so as to decode the PBCH of the pico eNB. Although the above PBCH to CRS power ratio may be contained in the handover command, it should be noted that the scope or spirit of the present invention is not limited thereto.

Whereas a UE handed over from the macro eNB to the pico eNB can receive necessary services from the pico eNB, the UE may receive serious interference from the macro eNB. In more detail, through the ABS of the macro eNB, the pico-eNB UE located in the corresponding subframe can receive data/control channels under the environment in which interference of the macro eNB is reduced, but the pico-eNB UE can continuously receive serious interference caused by CRS of the macro eNB. Therefore, the UE can improve the UE reception performance through the CRS interference cancellation/suppression scheme of the macro eNB.

In order to enable the UE to cancel/suppress CRS of the macro eNB, the UE has to recognize CRS information of a neighbor cell. That is, for CRS handling operations (i.e., interference cancellation, rate matching at transmitter, suppression or puncturing, etc.) of the neighbor cell, the UE needs to receive a cell ID of each cell (that must perform the above operations), information regarding the number of CRS ports, subframe information (for example, MBSFN configuration) for CRS transmission, bandwidth information required for CRS transmission of the corresponding cell, etc. Therefore, the macro eNB can transmit such CRS information to the UE, and the UE having received the CRS information can perform CRS handling only at a subframe to which CRS causing interference is transmitted, and can also perform the CRS handling at a bandwidth and an RE.

For CRS interference handling of a UE, RS information signaled by the eNB may include a cell ID of a neighbor cell, the number of CRS ports, and time/frequency information requisite for CRS transmission. Time-related information may be denoted by a subframe in which CRS is transmitted, and its associated signaling may be MBSFN subframe configuration. Frequency-related information requires a center frequency and bandwidth of each neighbor cell, the number of PRBs for CRS transmission, and the PRB position information. A message 'NeighborCellCRSInformation' requisite for transmission of such information may be defined as the following table 4.

TABLE 4

NeighborCellCRSInformation ::=    CHOICE {
    Cell ID
        { number of CRS ports,
          frequency information of CRS transmission,
          time information of CRS transmission }
}

Multiple cell IDs may be transmitted in 'NeighborCellCRSInformation', the number of CRS ports per cell ID, transmission of frequency CRS information, and time information of CRS transmission may be transmitted. Whereas the number of CRS ports per specific cell ID must be transmitted, frequency CRS information transmission and CRS transmission time information may be transmitted as necessary. In this case, the frequency CRS information transmission may be frequency information related to CRS transmission, and may be denoted by a center frequency and bandwidth of a specific cell, or the number of PRBs for CRS transmission and the PRB position information. The term 'time information' for CRS transmission may be time information related to CRS transmission, and may be denoted by a subframe in which CRS is transmitted. For example, the time information may be set to MBSFN subframe configuration.

The following description relates to UE handling when the UE does not receive at least one information other than the cell ID in the 'NeighborCellCRSInformation' information.

First, frequency information of CRS transmission may not be received. In this case, the UE assumes that the corresponding eNB broadcasts as many CRSs as the number of CRS ports signaled by the corresponding eNB to all the bands, and performs cancellation/reduction/puncturing/suppression of interference of CRS of the corresponding cell in association with the entire band of a serving cell. In contrast, if frequency CRS information is transmitted, the UE can perform CRS cancellation/reduction/puncturing/suppression/rate-matching only at a designated frequency band and a PRB position.

Second, if the number of CRS ports related to a specific cell ID and CRS transmission time information of the corresponding cell are transmitted to the UE, the UE performs cancellation/reduction/puncturing/suppression of CRS of the corresponding cell only at the designated time position. Preferably, such time information may be requisite for transmission of an MBSFN subframe configuration, and the eNB does not transmit CRS to a PDSCH region other than a PDCCH region at the MBSFN subframe. Therefore, the UE having received the MBSFN configuration of a specific cell can perform cancellation/reduction/puncturing/suppression/rate-matching of CRS of the corresponding cell only in a different subframe in which MBSFN is not configured by the corresponding cell.

In this case, the scheme for notifying the MBSFN subframe configuration of a neighbor cell will hereinafter be described in detail. Neighbor-cell MBSFN subframe configuration information received by the serving eNB through the X2 interface is used to indicate which subframe is used for MBSFN subframe configuration by the corresponding cell. A period and offset of a radio frame in which the MBSFN subframe is configured, and the position of the MBSFN subframe in the corresponding radio frame are notified using bitmap. The scheme for indicating the MBSFN subframe may be indicated in units of one radio frame or in units of four radio frames. In this case, each of the remaining subframes other than subframes #0, #4, #5, and #9 incapable of being used as MBSFN subframes is set to 0 or 1 to indicate whether or not the corresponding subframe is the MBSFN subframe. When MBSFN subframe configuration of a neighbor cell is signaled to the UE, the MBSFN-SubframeConfig IE can be transmitted per cell ID of each neighbor cell. MBSFN-SubframeConfig IE may be defined as the following table 5.

serving cell. $N_{s\_neighbor}$ is subframe number of a neighbor cell, and $N_{s\_serving}$ is subframe number of a serving cell. $\Delta f$ and $\Delta s$ are respectively a radio frame offset and a subframe offset value between the serving cell and a specific neighbor cell. $\Delta f$ and $\Delta s$ are variables that must be transmitted for each cell in 'NeighborCellCRSInformation'.

However, considering signaling overhead, transmission of only subframeAllocation contained in the MBSFN-SubframeConfig IE may be more efficient. Only oneFrame or fourFrames contained in the subframeAllocation is signaled to the UE. The eNB may transmit the MBSFN subframe configuration received from a neighbor cell to the UE without any change. However, the eNB may properly fabricate the MBSFN subframe configuration information, and may signal the fabricated resultant information to the UE as necessary. For example, in case of a cell in which the period

TABLE 5

```
-- ASN1START
MBSFN-SubframeConfig ::=        SEQUENCE {
      radioframeAllocationPeriod        ENUMERATED {n1, n2, n4, n8, n16, n32},
      radioframeAllocationOffset        INTEGER (0..7),
      subframeAllocation                CHOICE {
           oneFrame                     BIT STRING
(SIZE(6)),
           fourFrames                   BIT STRING
(SIZE(24))
      }
}
-- ASN1STOP
``` fourFrames

A bit-map indicating MBSFN subframe allocation in four consecutive radio frames, "1" denotes that the corresponding subframe is allocated for MBSFN. The bitmap is interpreted as follows:
FDD: Starting from the first radioframe and from the first/leftmost bit in the bitmap, the allocation applies to subframes #1, #2, #3, #6, #7, and #8 in the sequence of the four radio-frames.
TDD: Starting from the first radioframe and from the first/leftmost bit in the bitmap, the allocation applies to subframes #3, #4, #7, #8, and #9 in the sequence of the four radio-frames. The last four bits are not used. Uplink subframes are not allocated.
oneFrame "1" denotes that the corresponding subframe is allocated for MBSFN. The following mapping applies:
FDD: The first/leftmost bit defines the MBSFN allocation for subframe #1, the second bit for #2, third bit for #3, fourth bit for #6, fifth bit for #7, sixth bit for #8.
TDD: The first/leftmost bit defines the allocation for subframe #3, the second bit for #4, third bit for #7, fourth bit for #8, fifth bit for #9. Uplink subframes are not allocated. The last bit is not used.
radioFrameAllocationPeriod, radioFrameAllocationOffset Radio-frames that contain MBSFN subframes occur when equation SFN mod radioFrameAllocationPeriod = radioFrameAllocationOffset is satisfied. Value n1 for radioframeAllocationPeriod denotes value 1, n2 denotes value 2, and so on. When fourFrames is used for subframeAllocation, the equation defines the first radio frame referred to in the description below. Values n1 and n2 are not applicable when fourFrames is used.
subframeAllocation Defines the subframes that are allocated for MBSFN within the radio frame allocation period defined by the radioFrameAllocationPeriod and the radioFrameAllocationOffset.

Contents of the MBSFN-SubframeConfig IE not explained may refer to 3GPP TS 36.331.

Continuously, if a radio frame and a subframe boundary between neighbor eNBs are not aligned, the serving eNB needs to signal the radio frame offset and the subframe offset information related to a specific cell to the UE. For this operation, the UE can calculate subframe number and radio frame number of the neighbor cell using the following equations 2 and 3.

$$N_{f\_neighbor} = (N_{f\_serving} + \Delta f) \bmod (1024) \quad \text{[Equation 2]}$$

$$N_{s\_neighbor} = (N_{s\_serving} + \Delta s) \bmod (10) \quad \text{[Equation 3]}$$

In Equations 2 and 3, $N_{f\_neighbor}$ is radio frame number of a neighbor cell, and $N_{f\_serving}$ is radio frame number of a and offset of 'MBSFN subframeAllocation' are configured in units of oneframe or in units of fourFrames, the eNB may reconfigure the MBSFN subframe pattern according to radioframeAllocationPeriod, radioframeAllocationOffset, and subframeAllocation contained in the MBSFN-SubframeConfig IE in the form of a bitmap, and may then transmit the reconfigured MBSFN subframe pattern.

Assuming that fixed length of MBSFN subframe pattern, for example 4 frames of MBSFN subframe pattern, is signaled in 'NeighborCellCRSInformation' to the UE, when the serving eNB is received neighbor cell's MBSFN SubframeConfig information from neighbor cell composed of 'radioframeAllocationPeriod=2', 'radioframeAllocationOffset=0' and 'subframeAllocation', the serving eNB transmits the MBSFN subframe configuration of the corresponding cell as 111111000000111111000000 (24 bits) to the UE. Ruling out 4 subframes that cannot be set to MBSFN subframes in one radio frame, 6 bits can indicate whether each subframe in one radio frame is set to MBSFN subframe or normal subframe, and hence 24 bits can indicate MBSFN subframe configuration for four radio frames.

If the MBSFN subframe configuration of a neighbor cell is signaled to the UE in units of N radio frames, the serving eNB may signal 'Δf mod N' as a radio frame offset value rather than signaling of a radio frame offset value ranged from 0 to 1023 for each neighbor cell. The subframe offset may be separately signaled. These values are variables that must be transmitted for each cell within 'NeighborCellCRS-Information.

However, if the UE acquires subframe offsets of neighbor cells through PSS/SSS to measure RSRP/RSRQ of the neighbor cells, signaling of the subframe offset may be omitted. The UE may apply the subframe offsets of the neighbor cells acquiring through PSS/SSS to the MBSFN subframe configuration of neighbor cells, for performing CRS IC.

Figure 11:
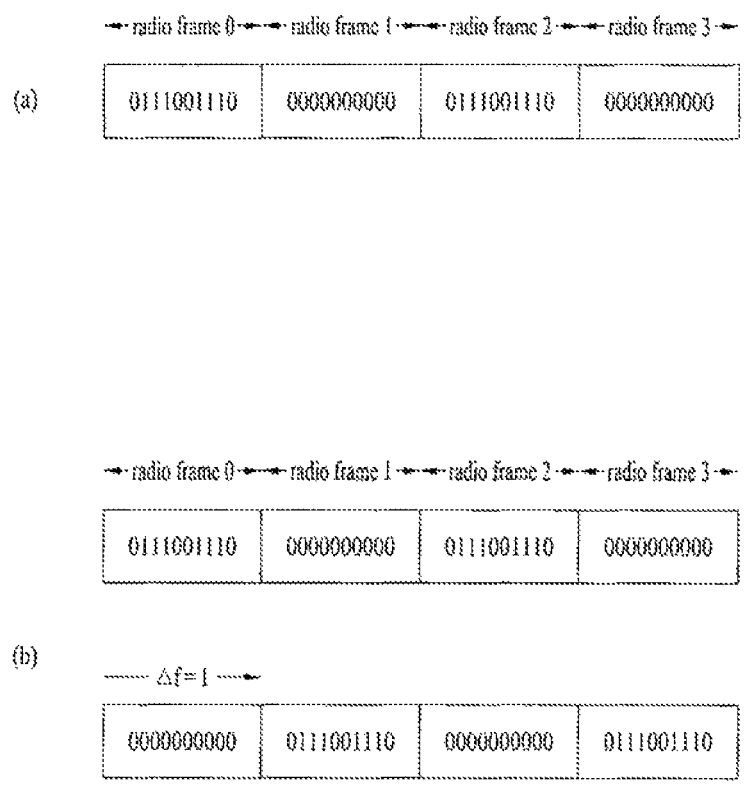
FIG. 11 is a diagram to describe a method of signaling a reference signal information of a neighbor cell according to one embodiment of the present invention.

In accordance with another scheme, since one radio frame is composed of 10 subframes, the serving eNB transmits the MBSFN subframe pattern by means of 10 bits signaling for one radio frame, such that the radio frame offset and the subframe offset value can be more definitely signaled to the UE. For example, if 'subframeAllocation=111111 (6 bits)', 'radioframeAllocationPeriod=2' and 'radioframeAllocationOffset=0', and if the number of bits is 10 for representing MBSFN subframe pattern corresponding to one radio frame as described above, the MBSFN subframe pattern for one radio frame of the corresponding cell may be denoted by 0111001110. Therefore, the MBSFN subframe pattern for 4 radio frame can be denoted by 0111001110000000000001110011100000000000 (40 bits) as shown in FIG. 11(a). That is, the eNB may modify and transmit the MBSFN subframe pattern of a specific neighbor cell.

If a radio frame offset Δf (or Δf mod N, N=4) between the serving cell and the neighbor cell is 1, the MBSFN subframe pattern which is circularly shifted by Δf, as shown in FIG. 11(b), is transmitted, such that the UE assumes that radio frames of the serving cell and the neighbor cell are arranged. In addition, the UE assumes that timing of cells are arranged without any radio frame offset when receiving the MBSFN subframe configuration of the neighbor cell, the UE can perform CRS interference handling with respect to corresponding cell on the basis of the obtained subframe offset of a neighbor cell in so far as a separate subframe offset is not signaled. In addition, if the subframe offset is present between the serving cell and the neighbor cell, the MBSFN subframe pattern may be shifted by the subframe offset, such that the UE can assume that timing in units of subframe between the serving cell and the neighbor cell are also arranged. In this case, when the UE receives the MBSFN subframe configuration of the neighbor cell, the UE performs CRS interference handling with respect to corresponding cell on the assumes that the cells are arranged without any the radio frame offset or the subframe offset.

Third, time information of CRS transmission may not be received. In more detail, MBSFN subframe may not be configured at a specific cell. In this case, it may be impossible to indicate the MBSFN subframe configuration of the specific cell. In another case, the serving eNB could not transmit MBSFN subframe configuration of neighbor cell because the serving eNB does not recognize MBSFN subframe configuration of the neighbor cell. This case might be occur when MBSFN subframe configuration of neighbor cell is not updated at the serving cell due to no real time communication via X2 interface.

Therefore, assuming that the UE receives only information indicating the number of CRS ports of a specific cell and does not receive the MBSFN subframe configuration, is the UE may assume that the corresponding cell configures all subframes as MBSFN subframe (or as normal subframes). According to the above-mentioned assumption, the UE can perform cancellation/reduction/puncturing/suppression/rate-matching with respect to CRS of the corresponding cell only in the case of a normal subframe. However, if the UE performs CRS interference cancellation on the assumption that CRS is present although CRS of the corresponding cell is not actually present, channel estimation errors unavoidably increase. Therefore, if the UE does not recognize the MBSFN subframe configuration of the neighbor cell, it is preferable that the UE assume all subframes as MBSFN subframe rather than normal subframe.

In another embodiment, if the UE receives only information regarding the number of CRS ports of a neighbor cell and does not receive the MBSFN subframe configuration, the UE assumes that all subframes of the corresponding cell are used as normal subframes, and can perform only CRS puncturing instead of CRS interference cancellation.

In another embodiment, if the eNB does not recognize the MBSFN subframe configuration of the neighbor cell, the eNB may transmits arbitrary MBSFN subframe configuration For example, when the eNB transmits information corresponding to the MBSFN subframe configuration of a specific cell that does not recognize the MBSFN subframe configuration, the eNB may indicate that all subframes of the specific cell are normal subframes (or MBSFN subframes).

In more detail, when the eNB transmits the arbitrary MBSFN subframe configuration, the eNB may command the UE to perform only CRS puncturing instead of CRS interference cancellation, by using separate signaling. In accordance with a detailed signaling scheme, if '0' indicates a normal subframe and '1' indicates the MBSFN subframe, a pattern composed of only zero values (000000 . . . ) (or a pattern composed of only '1' values (1111 . . . ) can be transmitted. Specifically, upon receiving the pattern composed of only '1' values (1111 . . . ) with respect to a specific cell ID, the UE perform CRS puncturing instead of CRS interference cancellation in all subframes to prevent channel estimation performance deterioration due to ambiguous information.

Meanwhile assuming that a specific UE has interference cancellation capability, RLM of the corresponding UE must be carried out on the basis of SINR obtained after completion of cancellation of CRS interference. Although interference exceeds a predetermined interference level, data and control information received by the corresponding UE can be stably demodulated and decoded because the corresponding UE performs interference cancellation.

Specifically, if the CRSs of several cells collide with each other because CRS positions are transmitted from the same REs as those of the neighbor cells, the UE first performs cancellation of a neighbor cell CRS act as dominant interference. Thereafter, the UE determines how much SINR of a CRS received from its own serving cell is good, such that it may determine whether to continuously maintain synchronization with the corresponding cell, or may decide to declare Radio Link Failure (RLF). However, CRS SINR obtained after performing CRS interference cancellation with respect to all CRSs of neighbor cells is unable to reflect realistic SINR in an REs other than CRS. The reason is that interference from neighbor cells may still remain in REs mapped to a PDCCH while interference may be removed from REs mapped to CRS Therefore, after completion of CRS interference cancellation, the degree of neighbor-cell interference applied to the REs mapped to a PDCCH needs to be recognized by the UE, such that the UE can recognize a substantial interference level and can perform more accurate RLM.

In conclusion, for reliable RLM, the PDCCH-to-CRS power ratio of a neighbor cell must be signaled to the UE. The UE performs CRS interference cancellation using such information, and then performs RLM by referring to the resultant value. That is, when measuring/calculating CRS SINR for RLM, the remaining information obtained after completion of CRS interference cancellation of a neighbor cell is calculated in consideration of the PDCCH-to-CRS power ratio of a neighbor.

The PDCCH-to-CRS power ratio of the neighbor cell can be transmitted as a higher layer signal. Specifically, if subframes divided into a plurality of subframe sets having different transmission powers in the same manner as in ABS, the PDCCH-to-CRS power ratio of the eNB must be signaled for each subframe set.

Figure 12:
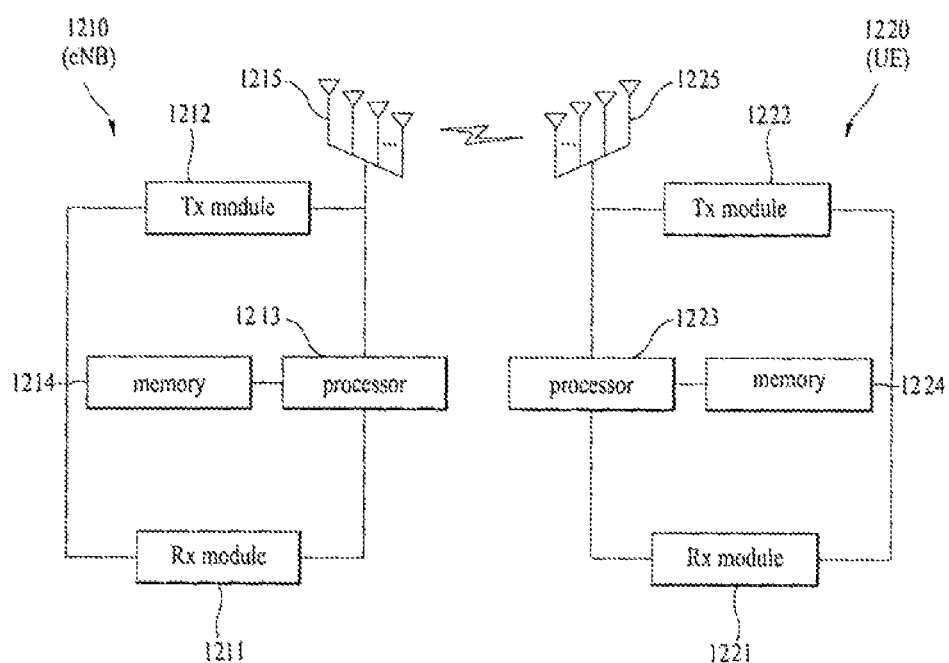
FIG. 12 is a diagram for a configuration of a transceiving device.

FIG. 12 is a block diagram illustrating a transmission point apparatus and a UE apparatus according to embodiments of the present invention.

Referring to FIG. 12, the transmission point apparatus 1210 according to the present invention may include a reception (Rx) module 1211, a transmission (Tx) module 1212, a processor 1213, a memory 1214, and a plurality of antennas 1215. The plurality of antennas 1215 indicates a transmission point apparatus for supporting MIMO transmission and reception. The reception (Rx) module 1211 may receive a variety of signals, data and information on an uplink starting from the UE. The Tx module 1212 may transmit a variety of signals, data and information on a downlink for the UE. The processor 1213 may provide overall control to the transmission point apparatus 1210.

The processor 1213 of the transmission point apparatus 1210 according to one embodiment of the present invention can process the above-mentioned embodiments.

The processor 1213 of the transmission point apparatus 1210 processes information received at the transmission point apparatus 1210 and transmission information to be transmitted externally. The memory 1214 may store the processed information for a predetermined time. The memory 1214 may be replaced with a component such as a buffer (not shown).

Referring to FIG. 12, the UE apparatus 1220 may include an Rx module 1221, a Tx module 1222, a processor 1223, a memory 1224, and a plurality of antennas 1225. The plurality of antennas 1225 indicates a UE apparatus supporting MIMO transmission and reception. The Rx module 1221 may receive downlink signals, data and information from the BS (eNB). The Tx module 1222 may transmit uplink signals, data and information to the BS (eNB). The processor 1223 may provide overall control to the UE apparatus 1220.

The processor 1223 of the UE apparatus 1220 according to one embodiment of the present invention can process the above-mentioned embodiments.

The processor 1223 of the UE apparatus 1220 processes information received at the UE apparatus 1220 and transmission information to be transmitted externally. The memory 1224 may store the processed information for a predetermined time. The memory 1224 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 1210 shown in FIG. 12 may be applied to the eNB (BS), or may also be applied to a relay node (RN) acting as a DL transmission entity or UL reception entity without departing from the scope or spirit of the present invention. In addition, the description of the UE apparatus 1220 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

Mode for Invention

Various embodiments have been described in the best mode for carrying out the invention.

INDUSTRIAL APPLICABILITY

The embodiments of the present invention can be applied to a variety of mobile communication systems.

The invention claimed is:

1. A method of receiving downlink signal by a user equipment in a wireless communication system, comprising the steps of:
   receiving an information related to a reference signal of a neighbor cell from a serving cell; and
   performing an interference handling in resources in accordance with the information related to the reference signal of the neighbor cell,
   wherein the information related to the reference signal of the neighbor cell comprises at least one selected from the group consisting of a cell ID (identity) of the neighbor cell, the number of ports for transmitting the reference signal of the neighbor cell, an frequency information for transmitting the reference signal of the neighbor cell and an time information for transmitting the reference signal of the neighbor cell,
   wherein the information on the time resource comprises a MBSFN subframe configuration of the neighbor cell, and
   wherein the user equipment performs the interference handling in a normal subframe identified by the MBSFN subframe configuration of the neighbor cell.

2. The method of claim 1, wherein if the user equipment fails in receiving the information on the time resource, the user equipment assumes that the neighbor cell has set all subframes as MBSFN (multimedia broadcast single frequency network) subframes.

3. The method of claim 1, wherein if the user equipment fails in receiving the information on the frequency resource, the user equipment assumes that the neighbor cell has transmitted the reference signal on a whole frequency band.

4. The method of claim 1, wherein the interference handling comprises one of a cancellation, a rate matching and a puncturing of the reference signal of the neighbor cell.

5. The method of claim 1, wherein the interference handling is used for at least one of a radio link monitoring and a radio resource management.

6. The method of claim 1, wherein the serving cell comprises a pico base station and wherein the neighbor cell comprises a macro base station.

7. The method of claim 1, wherein the reference signal comprises a cell-specific reference signal.

8. A method of transmitting signal at a base station in a wireless communication system, comprising the steps of:
   receiving an MBSFN (multimedia broadcast single frequency network) subframe pattern from a neighbor cell; and
   transmitting to a user equipment an information related to a reference signal of the neighbor cell including time information for transmitting the reference signal of the neighbor cell, wherein the time information is based on the received MBSFN subframe information,
   wherein the information related to the reference signal of the neighbor cell is used for interference handling of the user equipment, and
   wherein the time information for transmitting the reference signal of the neighbor cell is a MBSFN subframe pattern to which an adjustment is applied using a radio frame timing of the base station.

9. The method of claim 8, further comprising,
   transmitting a radio frame offset and an subframe offset between the neighbor cell and the base station.

10. The method of claim 8, wherein if the time information for transmitting the reference signal of the neighbor cell is a MBSFN subframe pattern comprising N radio frames, the base station transmits a value corresponding to 'radio frame offset mod N'.

11. The method of claim 8, wherein the adjustment comprises: applying a circular shift by a radio frame offset between the neighbor cell and the base station to the MBSFN subframe pattern.

* * * * *